United States Patent [19]

Baumann et al.

[11] 4,176,508

[45] Dec. 4, 1979

[54] LINE FEED MECHANISM FOR FILAMENT MOWER

[75] Inventors: James R. Baumann, St. Louis Park; Robert C. Comer, Hopkins; Jerome F. Yourczek, Minneapolis, all of Minn.

[73] Assignee: The Toro Company, Minneapolis, Minn.

[21] Appl. No.: 821,145

[22] Filed: Aug. 2, 1977

[51] Int. Cl.$^2$ .............................................. A01G 3/06
[52] U.S. Cl. ...................................... 56/12.7; 30/276; 56/17.5
[58] Field of Search ................ 56/12.7, 295, 17.5, 56/255; 30/276, 347; 51/335

[56] References Cited

U.S. PATENT DOCUMENTS

| | | | |
|---|---|---|---|
| 2,709,323 | 5/1955 | Swan | 51/335 |
| 3,664,102 | 5/1972 | Reber | 56/12.7 |
| 4,024,635 | 5/1977 | Mizuno et al. | 56/12.7 |
| 4,077,191 | 3/1978 | Pittinger, Sr. | 56/12.7 |

FOREIGN PATENT DOCUMENTS 852150  7/1977  Belgium ................................... 56/12.7

*Primary Examiner*—Jay N. Eskovitz
*Attorney, Agent, or Firm*—Merchant, Gould, Smith, Edell, Welter & Schmidt

[57] ABSTRACT

The disclosure is directed to filament metering apparatus for use with a rotary lawn mower that uses flexible filament as the cutting element. The filament is wound on a spool that is carried by the engine or motor drive shaft in an axially stationary position. The spool is capable of rotation relative to the drive shaft. A drive member is mounted for rotation with the drive shaft, and is axially movable thereon relative to a driven member carried by the spool. The drive member drivingly engages the driven member in each of two axial positions, and actuating means are included for axially shifting the drive member. The drive and driven members are so constructed that, as the drive member moves from one axial position to the other, relative rotational movement occurs therebetween, which movement is utilized to unwind filament from the spool in a discrete amount.

16 Claims, 7 Drawing Figures

LINE FEED MECHANISM FOR FILAMENT MOWER

The invention generally relates to flexible filament cutters, and is specifically directed to apparatus for metering discrete lengths of flexible filament in a rotary lawn mower.

Flexible filament cutters enjoy substantial popularity as lawn edging and trimming devices by reason of their ease and speed of operation as well as relative safety. Such devices usually take the form of a relatively small housing carried on an elongated handle enabling the operator to perform edging and trimming operations while walking or standing. The prime mover is a lightweight electric motor or gasoline engine, typically carried by the housing itself, and utilized to rotatably drive the free end of a flexible filament within the housing at relative high rotational velocities. The filament end thus defines an essentially circular cutting plane that is moved into cutting engagement with grass or other vegetation.

In this context, devices for metering filament to restore the worn or broken free filament end are not new. For example, the application of Henry B. Tillotson which is entitled "Line Metering Apparatus," filed on Aug. 13, 1976 under Ser. No. 714,013, and assigned to the same corporation to which this application is assigned, discloses apparatus for metering discrete lengths of filament from a filament holder or spool in an edging and trimming device.

This is specifically accomplished in the aforesaid Tillotson application through the use of a spool upon which filament is wound, and which is mounted for both axial and rotational movement relative to the rotating drive shaft. The drive shaft carries the drive gear having teeth which project radially outward. The filament holder carries a driven gear having first and second sets of gear teeth which project radially inward for selective engagement with the drive gear teeth. The two sets of driven gear teeth are spaced axially from each other and rotationally staggered by a predetermined angular amount. The filament holder is normally axially biased so that the drive gear teeth engage the upper set of driven gear teeth.

When the free filament end becomes worn or broken, additional filament may be metered by tapping the lower surface of the filament holder on the ground, which moves the filament holder upward axially against the bias of the spring until the drive gear teeth move out of engagement with the first set of driven gear teeth and into engagement with the second set of driven gear teeth. As this happens, the staggered relation of the driven gear teeth sets causes limited relative rotational movement of the spool relative to the drive shaft, which causes a predetermined length of filament to unwind. After the tapping force is removed, the spool returns to its original state and an additional length of filament unwinds in the same manner.

Thus, in the context of edging and trimming devices, apparatus for metering filament in discrete lengths is not in itself novel.

The subject invention, however, is specifically directed to the unique adaptation of filament metering apparatus to a device which performs the function of a rotary lawn mower in the traditional sense. Such adaptation presents difficult problems due to the inherent structural differences between flexible filament edgers and trimmers, and rotary lawn mowers. For example, edgers and trimmers are intended to be carried, which lends itself to the "tapping" approach to filament metering described above. Rotary lawn mowers, on the other hand, are wheeled, which of course is intended to preclude elevational movement of the lawn mower relative to the ground during operation. Thus, axial movement of a filament spool from the bottom of the lawn mower to effect filament metering during the cutting operation is not feasible.

Our invention approaches the filament metering problem from a different standpoint; viz., maintaining the filament spool in an axially stationary position while at the same time mounting the spool for rotation relative to a drive member. The drive member is rotatably driven and axially movable between first and second axial positions. In each axial position, the drive member is in driving engagement with a driven member secured to the spool. The drive and driven members are constructed so that, as the drive member moves from one axial position to the other, the driven member rotates a limited amount relative to the drive member in a direction which permits filament to centrifugally unwind from the spool.

Metering is thus accomplished by axially moving the drive member between its axial positions relative to the driven member and spool. However, since the drive member rotates at substantial circumferential velocities, and it is desirable to meter filament during operation of the lawn mower, means must be provided for effecting axial movement of the drive member as it rotates. This is a uniquely accomplished through means for mounting the drive member to the drive shaft of the engine or motor so that the drive member always rotates with the drive shaft but is axially movable relative thereto. An actuating member, preferably taking the form of an indexing sleeve, is mounted in opposition to the rotating drive member. The actuating member is essentially stationary from the standpoint of rotation, but is axially movable through camming structure which is manually controlled by the lawn mower operator. Rotatable bearing means are disposed between the actuating member and drive member, permitting axial shifting to occur even though the drive member rotates at a substantial rotational velocity relative to the actuating member.

As will become more apparent below, the invention is specifically adapted for use with a rotary lawn mower using flexible filament as the cutting element, and permits filament to be simply and easily metered in discrete lengths by the operator during lawn mower operations.

DESCRIPTION OF THE PREFERRED EMBODIMENT

Figure 1:
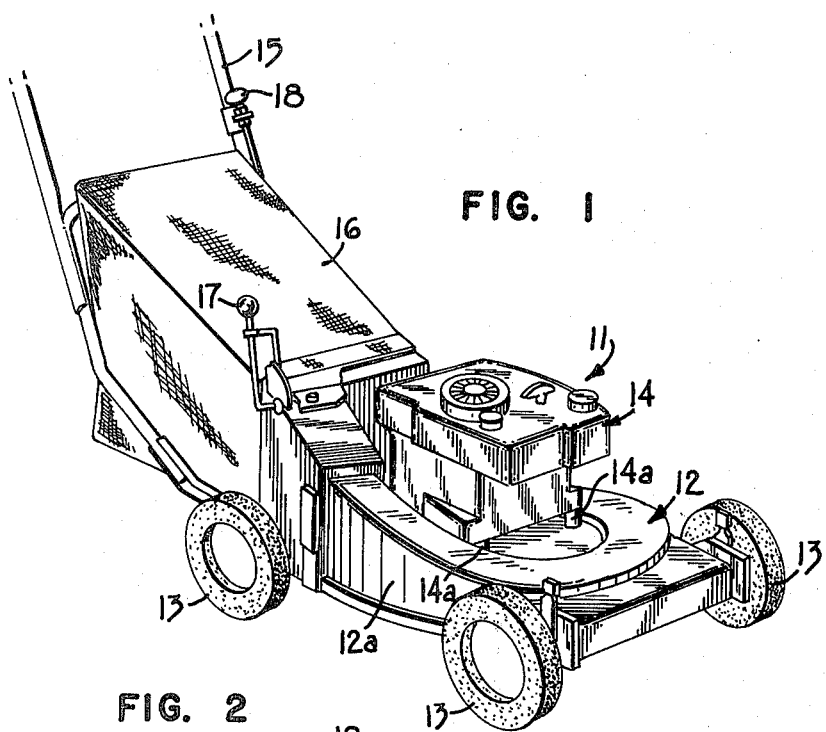
FIG. 1 is a perspective view of a lawn mower embodying the inventive filament metering apparatus.

In FIG. 1, a lawn mower of the rotary type is represented generally by the numeral 11. Lawn mower 11 comprises a housing 12 carried by wheels 13 and upon which an internal combustion engine 14 is mounted.

An operator's handle 15 is pivotally carried at the rear of housing 12, the handle 15 serving a secondary function of supporting part of rear mounted, grass-catching bag 16. The forward portion of the bag 16 is connected to the rear or outlet side of housing 12. Housing 12 defines a generally circular outlet tunnel 12a of increasing cross sectional dimension which, in combination with the rotary cutting mechanism, assists in the discharge of grass particles into the bag 16.

A control handle 17 serves to release the rear mounted bag 16 and to operate safety apparatus not pertinent to the present invention.

A control handle 18, which is connected to a Bowden cable serving a function to be described below, is mounted on handle 15.

Although lawn mower 11 is generally conventional in appearance by reason of its rotary drive, it is nonconventional in that it utilizes flexible filament to perform the function of cutting of grass or other vegetation. Thus, with additional reference to FIG. 2, it will be seen that lawn mower 11 includes four flexible filament ends 19a–19d which extend generally radially outward from the substantially vertical rotational axis of the lawn mower 11. Filament ends 19a–19d are preferably equiangularly spaced, and they are rotated at a relatively high circumferential velocity to define a cutting plane which, upon forward movement of the lawn mower 11, passes through and cuts grass to a desired height.

A circular bottom plate 21 is mounted in protecting relationship to the rotary driving and filament metering apparatus discussed below. A cutting blade 22 may be affixed to the inner surface of housing 12 relative to the filament ends 19a–19d so that, if the length of the filament ends 19a–19d exceeds a predetermined maximum after filament metering has occurred, the blade 22 will sever the filament ends 19a–19d as they rotate through their circular cutting paths. In this manner, excess flexible cutting filament is automatically removed by the blade 22.

Figure 3:
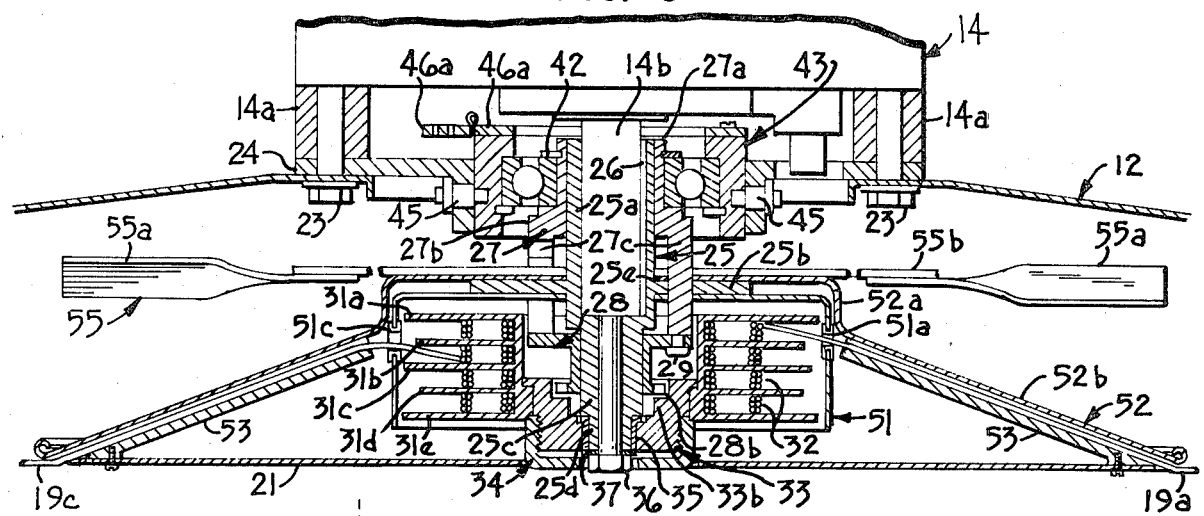
FIG. 3 is an enlarged fragmentary sectional view of the filament metering apparatus.
Figure 4:
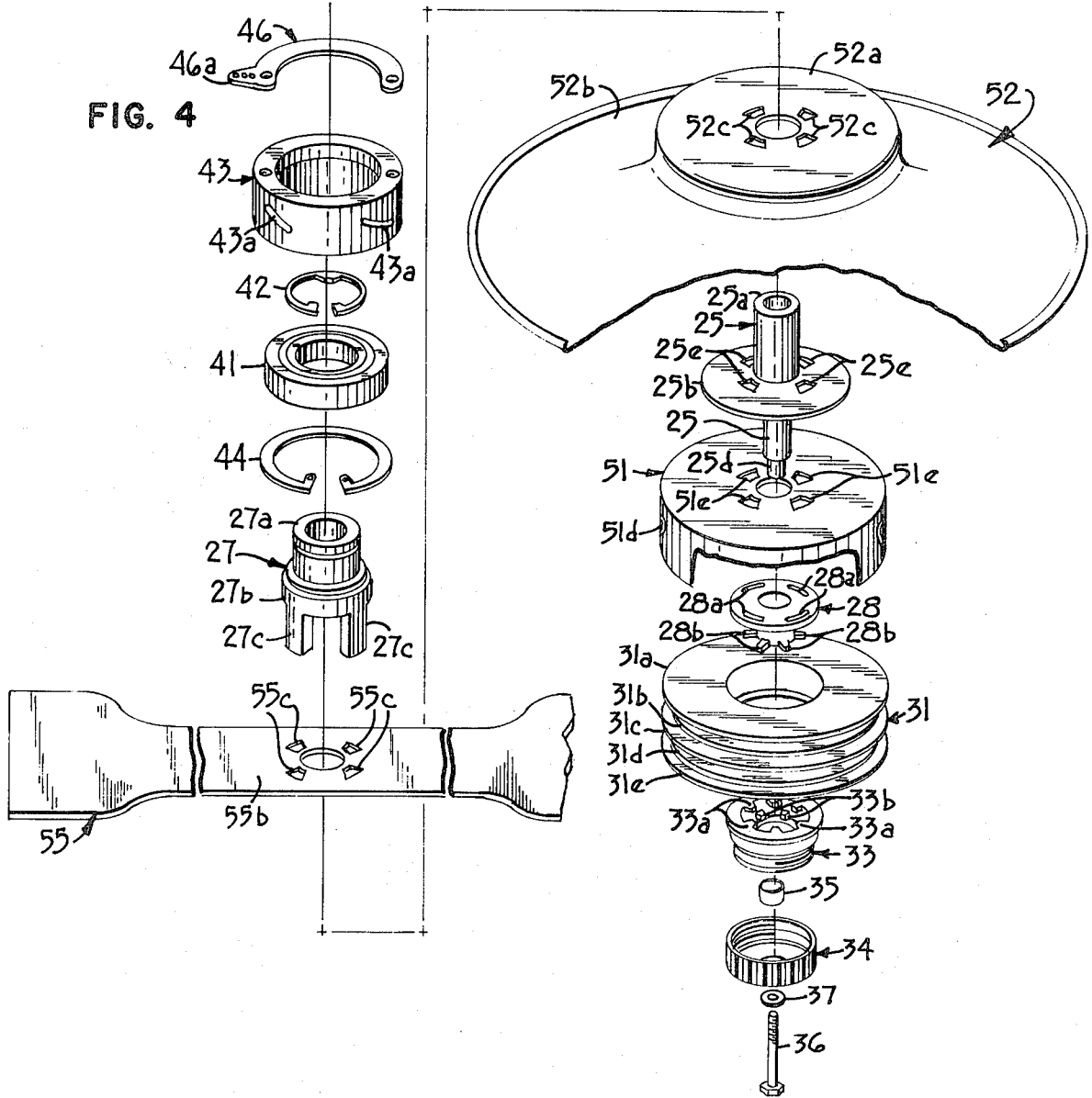
FIG. 4 is an exploded perspective view of the filament metering apparatus components.

FIGS. 3 and 4 are a detailed representation of the mechanism which rotates the filament ends 19a–19d, and which also serves to meter additional filament radially outward when the filament ends 19a–19d become worn or break off.

FIG. 3 shows engine 14 as having four mounting posts 14a each of which defines a vertical threaded aperture for receiving mounting bolts 23. As shown, mounting bolts 23 pass through appropriately positioned mounting openings in the housing 12, as well as mounting openings formed in a stationary hub 24 which is disposed between housing 12 and mounting posts 14a. Thus, tightening of the mounting bolts 23 serves to draw the engine 14 and stationary hub 24 into tight engagement with the housing 12. The purpose of stationary hub 24 is discussed below.

Engine 14 has a shaft 14b projecting downwardly through the housing 12 for rotation about a substantially vertical axis.

With additional reference to FIG. 4, a shaft hub 25 consists of an upwardly projecting tubular member 25a, a circular flange 25b and a downwardly projecting tubular member 25c. The tubular member 25c is stepped down to a decreased diameter at its extreme lower end, as indicated at 25d. Circular flange 25b is formed with four equiangularly spaced openings 25e, each of which may be described as an annular segment having a general trapezoidal appearance.

The inside diameter of the upwardly projecting cylindrical member 25a corresponds to the outer diameter of engine drive shaft 14b, enabling the shaft hub 25 to be slipped over shaft 14b. Driving engagement between the two is effected by a longitudinal key 26.

A slide indexer represented generally by the numeral 27 is defined by an upper slide portion 27a of a first outside diameter, and a lower leg portion 27b of greater outside diameter, and which has annular segments removed to define four equiangularly spaced legs 27c. The legs 27c are sized and spaced to fit into the corresponding annular segment openings 25e of the circular flange 25b of shaft hub 25. As will become more apparent below, the relation between the legs 27c and the annular segment openings 25e is one which permits guided relative axial movement between the two, while at the same time enabling shaft hub 25 to rotatably drive slide indexer 27.

The upper slide portion 27a is formed with an axial bore the diameter of which is slightly greater than the outside diameter of the cylindrical member 25a of shaft hub 25. It will also be noted in FIG. 3 that the axial dimension of slide portion 27a is somewhat less than the corresponding dimension of cylindrical member 25a. Although the slide indexer 27 rotates with the shaft hub 25 through drive means described below, this dimensional relationship enables the slide indexer 27 to move axially relative to the shaft hub 25 even while they are rotating together. The same dimensional relationship exists between the outside diameter of the downwardly projecting cylindrical member 25c and the axial bore of drive gear 28.

With continued reference to FIGS. 3 and 4, a drive gear 28 is secured to the bottom of legs 27c by four rivets or screws 29, only one of which is shown in FIG. 3. Drive gear 28 includes four arcuate slots 28a for mounting, enabling the gear 28 to be adjustably rotated to a proper position relative to slide indexer 27 before being secured.

Drive gear 28 is formed with a single set of six equiangularly spaced drive teeth 28b which project radially outward, and all of which are disposed within a single operating plane perpendicular to the axis of rotation.

Summarizing the structure described to this point, the shaft hub 25 is keyed to and rotates with the drive shaft 14b. The slide indexer 27, which carries the drive gear 28, is rotatably driven by the shaft hub 25 by the relationship of the legs 27c and segment openings 25e. The slide indexer 27 and drive gear 28 are capable of axial sliding movement relative to the shaft hub 25 and drive shaft 14b.

With continued reference to FIGS. 3 and 4, the filament metering apparatus further comprises a spool 31 having five axially spaced flanges 31a–31e defining four annular spool receptacles into which lengths of monofilament 32 are wound or coiled. The flanges 31a–31e are preferably axially spaced by the same amount, and the diameter of flanges 31b and 31d is slightly less than that of flanges 31a, 31c and 31e to permit a greater filament discharge angle, as shown in FIG. 3.

Spool 31 defines a large axial bore having a first diameter stepped to a smaller diameter. A driven gear 33 has an outer surface conforming to the spool and is disposed therein to define a core for the spool 31.

The lower outer surface of driven gear 33 is threaded, and a threaded cap 34 serves to secure the gear 33 and spool 31 rigidly together.

Driven gear 33 is formed with a first set of six equiangularly spaced gear teeth 33a which project radially inward and are dispoed in a common operating plane perpendicular to the axis of rotation. Axially spaced from the gear teeth 33a is a second set of six equiangularly spaced gear teeth 33b. Gear teeth 33b also project radially inward, and are commonly disposed in a second operating plane perpendicular to the axis of rotation. In addition to being axially spaced from the first set of gear teeth 33a, the second set of gear teeth 33b are rotationally or angularly staggered, so that in top plan (FIG. 6), each tooth 33b lies at the midpoint between two rotationally adjacent teeth 33a. Since there are six teeth in each gear tooth set, it follows that the center-to-center angular distance between teeth of a single set is 60°, and the center-to-center angular distance between rotationally adjacent teeth of different sets is 30°, as shown in FIG. 6.

Figure 6:
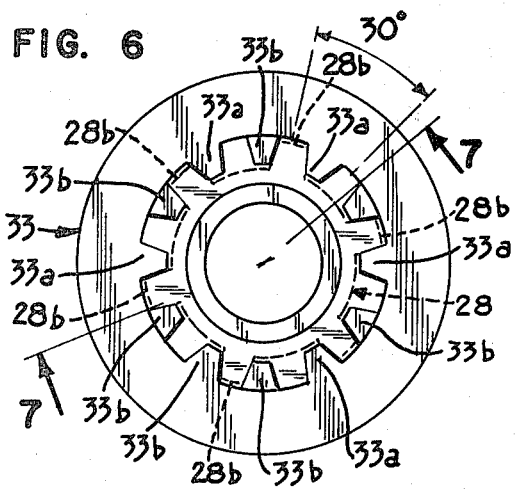
FIG. 6 is an enlarged view in top plan of a drive member of the filament metering apparatus superimposed onto a driven member.
Figure 7:
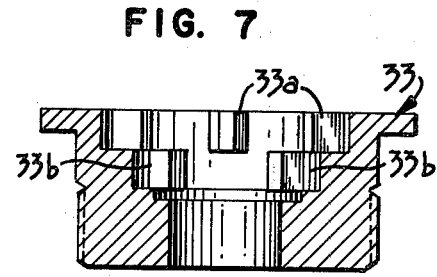
FIG. 7 is a transverse sectional view of the drive and driven members of FIG. 6, taken along the line 7—7 of FIG. 6.

The gear sets 33a, 33b of driven gear 33 are sized and disposed for selective driven engagement by the teeth 28b of drive gear 28, as shown in FIGS. 6 and 7. Which set of teeth 33a, 33b is selected for driven engagement depends on the axial position of the drive gear 28, which is controlled in a manner described below. As particularly shown in FIG. 7, the teeth 33a, 33b are immediately axially adjacent, therebeing no intermediate axial position for the drive teeth 28b as they are moved between gear set 33a, 33b.

However, as shown in FIG. 6, the rotationally staggered relation of the gear teeth set 33a, 33b results in a limited degree of angular lost motion as the gear teeth 28b move out of driving engagement with one of the gear teeth sets 33a, 33b and into engagement with the other. This is attended by relative rotational movement between the drive gear 28 and driven gear 33, which movement is utilized to meter a predetermined discrete length of monofilament from the spool 31.

To accomplish this objective, it will be appreciated that it is necessary for the spool 31 and driven gear 33 to be secured in an axially stationary position relative to axial movements of the drive gear 28. Further, it is necessary for the spool 31 and driven gear 33 to be rotatable relative to the drive gear 28 for the lost angular motion to occur. With reference to FIGS. 3 and 4, this is carried out by an annular bearing 35 which slips over the stepped down region 25d of shaft hub 25 and is sized to receive the driven gear 33. This of course permits the spool 31 and drive gear to rotate relative to the shaft hub 25.

Driven gear 33 and spool 31 are held in an axially stationary position by an axial bolt 36, which screws into an internal threaded bore of the engine drive shaft 14b. A washer 37 having a diameter corresponding to that of the annular bearing 35 permits the components to be drawn tightly together.

As shown in FIG. 3, the height or axial dimension of the threaded cap 34 defines a small axial space for the washer 37, and a large central opening in the cap 34 permits access to the head of bolt 36.

Axial movement of the drive gear 28 is effected with the following structure. A ball bearing 41 rests on the step between the slide portions 27a and leg portion 27b of slide indexer 27 and is held in such position by a snap ring 42 that is normally biased radially inward. The snap ring 42 fits into a peripheral groove appropriately located in the outer surface of slide portion 27a.

An indexing cylinder or sleeve 43 having a stepped inside diameter (FIG. 3) fits over the ball bearing 41 and is secured in place by a second snap ring 44 that is normally biased radially outward into a groove formed on the inner surface of the indexing cylinder 43. Four equiangularly spaced slots 43a are formed on the outer surface of indexing cylinder 43. The slots are preferably of helical configuration, but in the broad sense extend circumferentially between spaced axial points.

As shown in FIG. 3, the stationary hub 24 carries a stationary pin 45 for each of the helical slots 43a (only two are shown in FIG. 3), each of which projects radially inward for cam following engagement with the associated helical slot 43a. A control arm 46, which takes the form of a semicircular annular segment, is screwed to the top of indexing cylinder 43. Control arm 46 includes an ear 46a to which one end of a Bowden cable is connected. The opposite end is connected to the control handle 18, the manual operation of which rotates the indexing cylinder 43, causing it to spiral upward or downward to a limited degree, which is attended by corresponding axial sliding movement of the slide indexer 27 relative to the shaft hub 25.

Figure 5:
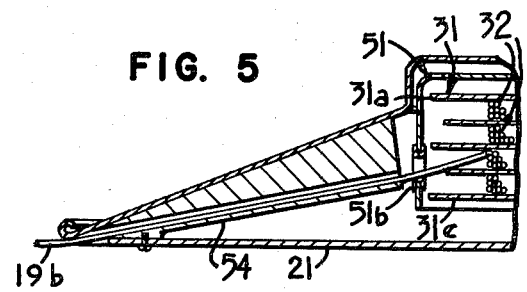
FIG. 5 is a fragmentary view similar to portions of FIG. 3, showing in particular a filament guide.

A cylindrical drum 51 overlies the spool 31 in protective relation, and includes four equiangularly spaced eyelets 51a–51d, through which the monofilament 32 is threaded. As is shown in FIGS. 3 and 5, the eyelets 51a, 51c are diametrically opposed at the same axial position, and they serve to guide monofilament threaded from the upper two spools. The eyelets 51b, 51d are also diametrically opposed for balancing purposes, but are disposed in a lower axial position on the drum 51 to receive and guide monofilament from the lower spools.

Drum 51 includes four annular segment openings 51e which receive the segment legs 27c. Within the overall assembly, it is disposed immediately below and secured to the circular flange 25b of shaft hub 25.

A guide drum 52 has a central portion 52a similar in shape to the drum 51 although slightly larger in shape, and an annular skirt 52b which angles downwardly from the central portion 52a. Segment openings 52c are sized to receive the legs 27c. Guide drum 52 is secured to the top surface of circular flange 25b, and is thereby in axial spaced relation to the drum 51.

With reference to FIGS. 3 and 5, monofilament guides 53, 54 are secured to the undersurface of the annular skirt 52b in radial alignment with the respective eyelets 51a–51d. Guides 53 are disposed opposite the eyelets 51a–51d and are identical in shape and position for balance purposes. As shown in FIG. 3, guides 53 extend from a point adjacent the associated eyelets 52a, 51c and extend radially outward to a point adjacent the peripheral edge of guide drum 53. Guides 54 (only one of which is shown in FIG. 5) include a triangular spacer 54a permitting the guiding structure to extend from a point adjacent the associated eyelet 51b or 51d to the same peripheral point on the guide drum 51. As described, the guides 53, 54 distribute the monofilament 32 from the respective spools to four equiangularly spaced points as shown in FIG. 2, with the free filament ends rotating at high speed in a cutting plane.

Figure 2:
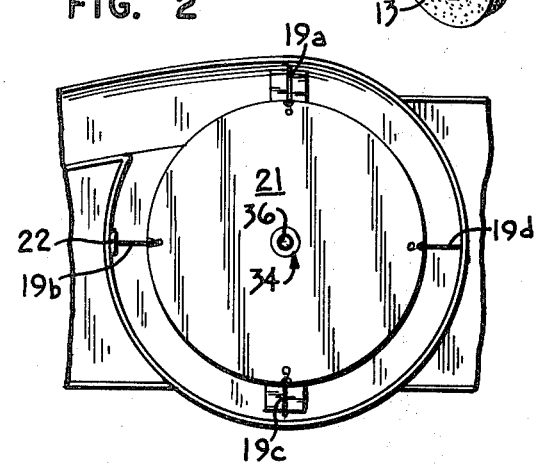
FIG. 2 is a fragmentary view in bottom plan of the lawn mower.

With reference to FIGS. 2 and 4, the protective circular plate 21 is screwed to the guides 53, 54, offering protection to the filament metering apparatus from dirt, grass clippings and the like.

Preferably, the assembly also includes an axial flow fan 55 which is shown in FIGS. 3 and 4. Fan 55 includes two opposed angular blades 55a secured to a flat connector 55b, the latter of which is formed with annular segment openings 55c to receive the legs 27c. As shown in FIG. 3, axial flow fan 55 is disposed on top of guide drum 52 and is secured therewith to the circular flange 25b of shaft hub 25. The angular blades 55a of axial flow fan 55 create an annular flow of air beneath the housing 12, assisting in the discharge of grass clippings and the like into the rear mounted bag 16.

In operation, rotation of the free flexible filament ends defines an essentially circular cutting path which, upon advancement of the lawn mower 11, serves to cut grass or other vegetation at a predetermined height.

The flexible monofilament ends 19a–19d may become shortened during normal use, at which time the monofilament 32 may be simultaneously metered radially outward at all four points in the following manner. Initially, it is assumed that the control handle 18 is in a first position pursuant to which the indexing cylinder 43, and hence the slide indexer 27 and drive gear 28, are at the upper axial position. This places the drive teeth 28b in engagement with driven teeth 33a, as shown in FIG. 6.

Metering of the monofilament 32 is brought about by moving the handle 18 to its opposite position; i.e., by pulling it out or pushing it in. Assuming that the indexing cylinder 43 is in its upper position with the handle 18 in its "out" position, pressing the handle 18 will cause the indexing cylinder 43 to rotate, and thereby spiral downward due to the camming action of pins 45 in the grooves 43a. This downward movement also carries the slide indexer 27 and drive gear 28 axially downward, causing the drive teeth 28b to leave driving engagement with the teeth 33a, and to move into driving engagement with the teeth 33b. This is possible because of the angular gap between the teeth 33b, into which the teeth 28b move (FIG. 6).

As soon as the drive teeth 28b leave engagement with the driven teeth 33a, driven gear 33 and spool 31 lose their rotational drive. This lasts for only as long as it takes the drive teeth 28b to engage the angularly staggered driven teeth 33b, which is but an instant of time. During that instant, however, the spool, having lost its rotational force, is allowed to slow down, and it actually moves rearwardly (i.e., in a rotational direction opposite that of drive shaft movement) relative to the drive gear 28. This backwards rotational movement is in a direction which permits wound lengths of the monofilament 32 to unwind from the respective spools in an amount directly corresponding to the angular relative movement between drive gear 28 and driven gear 33. As shown in FIG. 6, this approximates 30°. The length of monofilament metered is, of course, also a function of the diameter of spool 31.

When it is necessary to meter a further length of monofilament from each of the four spools, this can be accomplished by pulling the control handle 18 which, through the intervention of the Bowden cable, causes the indexing sleeve 43 to rotate in the opposite direction and spiral upward a limited distance. Such upward movement carries with it the slide indexer 27 and drive gear 28. Thus, the drive teeth 28b leave the engagement of the driven teeth 33b, momentarily causing relative movement between the drive gear 28 and driven gear 33 in a direction permitting the monofilament to centrifugally unwind.

As described above, the length of monofilament metered is a direct function of the spool diameter and angular displacement of the spool 31 relative to the drive gear 28. Although this is a specified amount and may be precisely the length needed to restore a given monofilament to the desired effective cutting length, it will also be appreciated that, at the same point in time, the other monofilament lengths may need more or less monofilament. This problem is overcome by metering a minimum length of monofilament at each point, and utilizing the cutting blade 22 to cut the free filament ends 19a–19d to the desired effective length.

What is claimed is:

1. In a vegetation cutting device in which a flexible filament is rotatably driven about a substantially vertical axis with a free end of the filament defining a cutting plane, apparatus for metering discrete lengths of the filament comprising:
    (a) drive shaft means rotatably driven about said axis;
    (b) spool means upon which flexible filament may be wound, the spool means being carried by the shaft means for rotational movement relative thereto and in an axially stationary position thereon;
    (c) driving means mounted for rotation with the shaft means and axially movable relative thereto between first and second axial positions;
    (d) indexing means mounted for rotation with said shaft means and associated with said driving means to cause said driving means to shift axially in response to axial movements thereof;
    (e) driven means mounted for rotation with the spool means;
    (f) one of said driving and driven means including first and second engageable means axially spaced in relation to said first and second axial positions, said first and second engageable means being rotationally spaced by a predetermined angular amount;
    (g) the other of said driving and driven means including engagement means for selectively engaging the first and second engageable means with the driving means in said first and second axial positions, respectively;
    (h) and actuating means, isolated from rotary movement of said indexing means, for axially moving the driving means between said first and second axial positions;
    (i) the engageable and engagement means being so constructed that the driving and driven means are in rotatable driving engagement with the driving means in either axial position, and movement of the driving means from axial position to the other causes the driven means to rotate relative to the driving means in an amount corresponding to said predetermined angular amount, and in a direction permitting filament to unwind from the spool means in said discrete amount.

2. The apparatus defined by claim 1, wherein the spool means comprises a single spool member defining a plurality of filament receptacles within which filament may be wound; and further comprising means for guiding each free filament end essentially radially outward, the guide means being disposed for balanced rotation.

3. The apparatus defined by claim 2, wherein the spool member defines four spool receptacles and four filament guiding means, the filament guiding means being diametrically opposed.

4. The apparatus defined by claim 2, wherein the filament receptacles are axially spaced.

5. The apparatus defined by claim 2, wherein the driven means defines a core for the spool member.

6. The apparatus defined by claim 2, wherein the filament guiding means comprises:
   (a) a guide drum mounted for rotation with the drive shaft means and disposed in overlying relation to the spool means;
   (b) and a filament guide for each filament receptacle, each guide being carried by the guide drum and extending radially outward.

7. The apparatus defined by claim 1, wherein the first and second engageable means are included with the driven means.

8. The apparatus defined by claim 7, wherein:
   (a) the driving means comprises a drive gear;
   (b) the engagement means comprises a first plurality of gear teeth carried by the driven gear and commonly disposed in an operational plane disposed substantially perpendicular to said axis;
   (c) the driven means comprises a driven gear;
   (d) and the first and second engageable means comprise second and third pluralities of gear teeth carried by the driven gear, said pluralities of gear teeth being respectively disposed in separate operational planes each of which lies substantially perpendicular to said axis.

9. The apparatus defined by claim 8, wherein said pluralities of gear teeth comprise the same number of teeth.

10. The apparatus defined by claim 8, wherein:
    (a) the first plurality of gear teeth project radially outward from the drive gear in equidistant circumferential relation;
    (b) and each of the second and third pluralities of gear teeth project radially inward from the driven gear in equidistant circumferential relation.

11. The apparatus defined by claim 10, wherein each tooth of the third plurality of gear teeth is equiangularly disposed between rotationally adjacent gear teeth of the second plurality of gear teeth.

12. In a vegetation cutting device in which a flexible filament is rotatably driven about a substantially vertical axis with a free end of the filament defining a cutting plane, apparatus for metering discrete lengths of the filament comprising:
    (a) drive shaft means rotatably driven about said axis;
    (b) spool means upon which flexible filament may be wound, the spool means being carried by the shaft means for rotational movement relative thereto and in an axially stationary position thereon;
    (c) driving means mounted for rotation with the shaft means and axially movable relative thereto between first and second axial positions;
    (d) driven means mounted for rotation with the spool means,
    (e) one of said driving and driven means including first and second engageable means axially spaced in relation to said first and second axial positions, said first and second engageable means being rotationally spaced by a predetermined angular amount;
    (f) the other of said driving and driven means including engagement means for selectively engaging the first and second engageable means with the driving means in said first and second axial positions, respectively;
    (g) and actuating means for axially moving the driving means between said first and second axial positions, said actuating means comprising an axially movable indexing member mounted in opposed relation to the driving means, bearing means disposed between the indexing member and the driving means and permitting relative rotational movement therebetween, and means for moving the indexing means between first and second axial points, the axial distance between said points corresponding to the axial distance between said first and second axial positions of the driving means;
    (h) the engageable and engagement means being so constructed that the driving and driven means are in rotatable driving engagement with the driving means in either axial position, and movement of the driving means from one axial position to the other causes the driven means to rotate relative to the driving means in an amount corresponding to said predetermined angular amount, and in a direction permitting filament to unwind from the spool means in said discrete amount.

13. In a vegetation cutting device in which a flexible filament is rotatably driven about a substantially vertical axis with a free end of the filament defining a cutting plane, apparatus for metering discrete lengths of the filament comprising:
    (a) drive shaft means rotatably driven about said axis;
    (b) spool means upon which flexible filament may be wound, the spool means being carried by the shaft means for rotational movement relative thereto and in an axially stationary position thereon;
    (c) driving means mounted for rotation with the shaft means and axially movable relative thereto between first and second axial positions;
    (d) driven means mounted for rotation with the spool means;
    (e) one of said driving and driven means including first and second engageable means axially spaced in relation to said first and second axial positions, said first and second engageable means being rotationally spaced by a predetermined angular amount;
    (f) the other of said driving and driven means including engagement means for selectively engaging the first and second engageable means with the driving means in said first and second axial positions, respectively;
    (g) and actuating means for axially moving the driving means between said first and second axial positions, said actuating means comprising an annular indexing sleeve mounted in surrounding relation to the driving means, the indexing sleeve having at least one groove formed in its outer surface which extends circumferentially between axially spaced points, bearing means mounted between the indexing sleeve and the driving member and permitting relative rotational movement therebetween, a stationary pin projecting into said groove, and means for turning said sleeve relative to the stationary pin.

14. The apparatus defined by claim 13, wherein the indexing member includes a plurality of equiangularly spaced grooves, and further comprising a stationary pin for each groove.

15. The apparatus defined by claim 13, wherein the groove is of helical configuration.

16. The apparatus defined by claim 13, wherein the sleeve turning means comprises a control arm affixed to the sleeve and a Bowden cable operatively connected to the control arm.

* * * * *